United States Patent [19]

Foster et al.

[11] Patent Number: 5,204,402
[45] Date of Patent: Apr. 20, 1993

[54] MULTIPURPOSE ADDITIVE SYSTEM FOR THERMOPLASTIC RESINS

[75] Inventors: George N. Foster, Bloomsbury, N.J.; Anthony J. Gioffre, Ridgefield, Conn.

[73] Assignee: Union Carbide Chemicals & Plastics Technology Corporation, Danbury, Conn.

[21] Appl. No.: 625,546

[22] Filed: Dec. 11, 1990

[51] Int. Cl.$^5$ .................................................. C08K 3/34
[52] U.S. Cl. ........................................ 524/450; 106/482; 106/490; 106/491; 428/403; 428/404; 428/405; 523/202; 523/203; 523/213
[58] Field of Search ............... 523/213, 202, 203; 524/450; 106/482, 490, 491; 428/403, 404, 405

[56] References Cited

U.S. PATENT DOCUMENTS

| | | | |
|---|---|---|---|
| 4,242,251 | 12/1980 | Aishima et al. | 523/202 |
| 4,412,015 | 10/1983 | Lustgarten et al. | 523/212 |
| 4,499,229 | 2/1985 | Lockhart | 524/450 |
| 4,704,424 | 11/1987 | Sands | 524/450 |
| 4,741,779 | 5/1988 | Mita et al. | 524/450 |
| 4,801,445 | 1/1989 | Fukui et al. | 523/215 |
| 4,962,178 | 10/1990 | Harisiades | 528/33 |

FOREIGN PATENT DOCUMENTS

| | | | |
|---|---|---|---|
| 58-069717 | 4/1983 | Japan | 524/450 |
| 0213031 | 12/1983 | Japan | 524/450 |

*Primary Examiner*—Melvyn I. Marquis
*Attorney, Agent, or Firm*—Saul R. Bresch

[57] ABSTRACT

A multipurpose additive system comprising
(a) an alkali metal zeolite, an alkaline earth metal zeolite, zinc zeolite, or mixtures thereof;
(b)
 (i) an aliphatic compound containing at least six carbon atoms substituted with one or more polar functional groups sufficient to provide a polar group frequency factor of at least about 0.01; or
 (ii) a polydimethylsiloxane compound containing from 4 to about 500 siloxane units, substituted with one or more polar functional groups sufficient to provide a polar group frequency factor of at least about 0.01; or
 (iii) mixtures thereof in any proportion; and
(c) optionally, zinc oxide.

17 Claims, No Drawings

MULTIPURPOSE ADDITIVE SYSTEM FOR THERMOPLASTIC RESINS

TECHNICAL FIELD

This invention relates to an additive system which can enhance thermoplastic resins by improving their resistance to discoloration, inhibiting corrosion, providing melt process stability and antiblock or release properties, and/or acting as a catalyst deactivator or a stabilization synergist. The additive system is particularly useful when the thermoplastic resin is to find application in extruded film, or in molded or fabricated articles.

BACKGROUND INFORMATION

In a patent application entitled Polymer Finishing Process filed on even date by George N. Foster and Hugh E. McGee under Ser. No. 625,933, a process was proposed whereby catalyst deactivator compounds, thermal oxidation stabilizer compounds, and general purpose additives were added sequentially to a polymer melt. The object of this process was to improve the stability of the polymer and avoid discoloration. In another patent application entitled Polymer Impurity Deactivators also filed on even date by George N. Foster and Walter T. Reichle under Ser. No. 628,848, a particular catalyst deactivator composition was proposed as another route to the same end, particularly in terms of resin stability. While both the process and composition represent advances in the resin additive field, the identification of an additive system, which not only provides catalyst deactivation and resin stabilization, but additional enhancements, in other words, a multipurpose additive system, would offer industry a useful alternative.

DISCLOSURE OF THE INVENTION

An object of this invention, therefore, is to provide a multipurpose additive system for thermoplastic resins, which will increase the usefulness of the resins in extruded film and molded and fabricated article applications.

Other objects and advantages will become apparent hereinafter.

According to the present invention, such a multipurpose additive system for thermoplastic resins has been discovered comprising:
(a) an alkali metal zeolite, an alkaline earth metal zeolite, zinc zeolite, or mixtures thereof;
(b) a dispersant, said dispersant being
  (i) an aliphatic compound containing at least six carbon atoms substituted with one or more polar functional groups sufficient to provide a polar group frequency factor of at least about 0.01; or
  (ii) a polydimethylsiloxane compound containing 4 to about 500 siloxane units, substituted with one or more polar functional groups sufficient to provide a polar group frequency factor of at least about 0.01; or
  (iii) mixtures thereof in any proportions; and
(c) optionally, zinc oxide.

DESCRIPTION OF THE PREFERRED EMBODIMENT(S)

The multipurpose additive system is a combination of one or more molecular sieves and dispersants. Each of the components is selected because they serve more than one function, and preferably several functions. One of the functions of the dispersant, as the name implies, is to serve as a dispersing agent for the molecular sieves and itself. Homogeneous dispersion throughout the resin is important if the resin is to take full advantage of the various functions or property enhancements, which can be provided by the additives. These functions can include an improvement in the resistance of thermoplastic resins to discoloration caused by catalyst residue; the inhibition of the corrosive effects on the extruder or other equipment through which the resin and additive system passes; acting as acid scavengers, e.g., of hydrogen chloride; providing the resin with stability during melt processing; imbuing the resin with antiblock or release properties; deactivating the catalyst residue present in the resin; and acting as a stabilization synergist, i.e., where either the molecular sieve or the dispersant acts as a stabilizer for the resin, the other component enhances the stabilizing effect.

The molecular sieves are either alkali metal zeolites, alkaline earth metal zeolites, or zinc zeolites. Zeolites are crystalline, hydrated aluminosilicates of Group I and Group II elements. They are described in Zeolite Molecular Sieves, D. W. Breck, published by John Wiley & Sons, New York, 1974, particularly pages 245 to 378, which discuss the synthetic zeolites. The structural formula for a zeolite is expressed as follows:

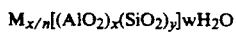

$$M_{x/n}[(AlO_2)_x(SiO_2)_y]wH_2O$$

wherein
M = a cation
n = the valence of the cation
w = the number of water molecules
y/x = <1 to 5
x+y = total number of tetrahedra.

Preferred cations are sodium, calcium and zinc.

The average particle sizes of the zeolites are preferably in the range of about 0.1 to about 15 microns and most preferably in the range of about 3 to about 8 microns for antiblock purposes.

The zeolites can be used as is or coated with about 1 to about 20 percent by weight of a surface active agent in order to improve their wettability. The percent by weight of surface active agent is based on the weight of the zeolite. Examples of suitable surface active agents are diethanol stearyl amine; 3-hydroxypropyl functionalized polydimethylsiloxane; glycerol; mannitol; sorbitol; glyceryl mono- and di-dodecanoate and octadecanoate esters; dodecyl and octadecyl adipate and thio dipropionate; dodecylamine; hexadecylamine; octadecylamine; dodecyl diethanolamine; hexadecyl diethanolamine; octadecyl diethanolamine; dodecyl dimethanolamine; hexadecyl dimethanolamine; octadecyl-dimethanolamine; dodecylic acid; hexadecylic acid; octadecylic acid; sodium, zinc, calcium, or magnesium stearate; 12-hydroxy stearate; and stearoyl lactylate. These surface active agents function as dispersants and neutralizers or stabilizers.

The dispersants can be either fatty acids or other functionalized hydrocarbon compounds having 6 to 50 carbon atoms and preferably 10 to 24 carbon atoms, or functionalized polydimethylsiloxane compounds having 4 to 500 siloxane units and preferably 5 to 200 siloxane units. Each of these compounds has one or more polar groups incorporated into its molecular structure to provide a polar group frequency factor of at least about 0.01. The polar group frequency factor, which is a measure of the number of polar functionalities in the compound, can be in the range of about 0.01 to about 1 and is preferably in the range of about 0.05 to about 0.2. The "polar group frequency factor" is the ratio of the total number of polar groups in each compound to the total number of C—C, C—O, Si—C, and Si—O linkages in the compound.

Examples of functionalities, which will provide the polar groups are hydroxyl, amino, dialkanol amino, carboxyl and carboxylate salts and esters, e.g., COO—, —COOH, —COOR, COOR—, and COOM wherein R is a hydrocarbyl group and M is a metal, epoxy, hydroxylamino, hindered phenolic or hindered amino, and alkylene oxide wherein the alkylene group has 2 to 4 carbon atoms.

A formula for a typical functionalized polydimethylsiloxane can be written as follows:

$$MD_xD'_yM$$

wherein $M = R_3SiO$ or $R'R_2SiO$

R = methyl or ethyl

R' = a linear, branched or cyclic alkyl having 3 to 100 carbon atoms $D = R_2SiO$ $$D' = R - \underset{R'}{\underset{|}{Si}O}$$

R-SiO with the proviso that a sufficient number of R and R' groups are, or contain, polar functionalities to provide a polar group frequency factor of at least about 0.01, and each R and R' are the same or different $x + y = 4$ to 500

$x/y = $ is greater than or equal to 0

Examples of useful functionalized polydimethylsiloxanes are hydroxyl, amino, hydroxylamino, hindered phenol or amino, ethoxylate, or epoxy substituted polydimethylsiloxanes (cyclic, linear, or branched), optionally including alkyl substituents.

The zeolites and dispersants are generally used in a ratio of about 0.1 to about 4 parts by weight of zeolite per part by weight of dispersant and preferably in a ratio of about 0.2 to about 2 parts by weight of zeolite per part by weight of dispersant.

The multipurpose additive system can be added directly to the polymerization reactor or in a post-reactor step depending on the nature of the catalyst system, the amount of absorbed moisture, and whether the dispersant is inert to the catalyst. The post-reactor addition can be accomplished by dry blending the multipurpose additive system, usually in combination with antioxidants, with granular or powder forms of the polymer as it comes from the reactor. The multipurpose additive system can also be incorporated into the resin via a masterbatch or directly melt compounded into the resin using batch or continuous mixing equipment.

In order to provide a composition with relatively better antiblock and anti-sticking properties, it is preferred that the average particle size of the zeolite is in the about 3 to about 6 micron range with less than about 0.5 percent by weight of the particles being greater than about 12 microns. To provide an attractive substitute for nucleation, it is preferred that the average particle size of the zeolite is less than about 1 micron.

Typical polymers to which the multipurpose additive system of the invention can be added are thermoplastic resins prepared with Ziegler-Natta or transition metal catalysts.

These thermoplastic resins can be any crosslinkable homopolymers or copolymers produced from two or more comonomers, or a blend of two or more of these polymers, conventionally used in film, sheet, and tubing, in molded and fabricated articles and as jacketing and/or insulating materials in wire and cable applications. Generally, the monomers useful in the production of these homopolymers and copolymers will have 2 to 20 carbon atoms, and preferably 2 to 12 carbon atoms. Examples of such monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotrifluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. In addition to polyolefins, included among the polymers can be polyesters, polycarbonates, and polyurethanes. The homopolymers and copolymers of ethylene are preferred, both in the non-halogenated and halogenated form. Included in this preferred group are terpolymers such as ethylene/propylene/diene monomer rubbers.

The thermoplastic resin can also be, for example, a high pressure homopolymer of ethylene; a copolymer of ethylene and one or more alpha-olefins having 3 to 12 carbon atoms; a homopolymer or copolymer of ethylene having a hydrolyzable silane grafted to their backbones; a copolymer of ethylene and a hydrolyzable silane; or a copolymer of an alpha-olefin having 2 to 12 carbon atoms and an unsaturated ester having 4 to 20 carbon atoms, e.g., an ethylene/ethyl acrylate or vinyl acetate copolymer; an ethylene/ethyl acrylate or vinyl acetate/hydrolyzable silane terpolymer; and ethylene/ethyl acrylate or vinyl acetate copolymers having a hydrolyzable silane grafted to their backbones.

The homopolymers or copolymers can be crosslinked or cured with an organic peroxide, or to make them hydrolyzable, they can be grafted with a vinyl trialkoxy silane in the presence of an organic peroxide which acts as a free radical generator or catalyst. Useful vinyl trialkoxy silanes include vinyl trimethoxy silane, vinyl trialkoxy silane, and vinyl triisopropoxy silane.

These polymers are useful in a number of manufacturing processes including blown and cast film extrusion, injection molding of parts or articles, blown molding of bottles, insulation and jacketing extrusion for wire and cable, and sheet extrusion for thermoforming.

Other additives can be added along with the multi-purpose additive system of the invention. Such additives include thermal and photo-oxidation stabilizers, antistatic agents, pigments, dyes, inorganic and polymeric fillers, extenders, fire retardants, plasticizers, processing aids, lubricants, smoke inhibitors, viscosity control agents, vulcanizing agents, crosslinking agents, crosslinking boosters, and anti-block/slip agents.

The patent applications, publications, and patents referred to in this specification are incorporated by reference herein.

The invention is illustrated by the following examples.

EXAMPLES 1 to 7

The additives are mixed with linear low density polyethylene (LLDPE) and processed through a Brabender ™ extruder at 250° C. The LLDPE is a copolymer of 93 percent by weight ethylene and 7 percent by weight 1-butene. The copolymer has a density of 0.918 gram per cubic centimeter and a melt index of 0.9 grams per 10 minutes. 100 parts by weight LLDPE is used in each example together with 300 ppm of an antioxidant, octadecyl 3,5-di-tert-butyl-4-hydroxyhydrocinnamate.

The variables and results of the extrusion are set forth in Table I.

TABLE I

| Example | Additives | melt index | melt flow ratio | die swell (%) | yellowness index | haze (%) |
|---|---|---|---|---|---|---|
| 1 | DESA (500 ppm) | 0.89 | 28 | 30 | 2.3/6.7 | 74 |
| 2 |سodium zeolite 500 ppm/ 90% <1 micron | 0.86 | 28 | 37 | 6.0/11 | 68 |
| 3 | sodium zeolite 500 ppm/ 3 to 4 microns (average) | 0.88 | 27 | 32 | 7.1/12 | 72 |
| 4 | hydroxy sodalite 500 ppm/ 40% <1 micron | 0.86 | 26 | 39 | 8.2/14 | 63 |
| 5 | sodium zeolite 500 ppm/ 3 to 4 microns (average) coated with 15% DESA | 0.86 | 27 | 29 | 1.8/5.8 | 76 |
| 6 | DBS (0.1%) | — | — | — | — | 49 |
| 7 | none | 0.79 | 30 | 43 | 9.0/15 | 74 |

Notes to Tables:
1. DESA = diethanol stearyl amine having a polar group frequency factor of 0.24.
2. ppm = parts per million parts of LLDPE.
3. 90% <1 micron = 90 percent by weight of the zeolite particles are less than 1 micron in size.
4. 3 to 4 microns (average) = the average particle size of the zeolite.
5. 40% <1 micron = 40 percent by weight of the zeolite particles are less than 1 micron in size.
6. Coated with 15% DESA = coated with 15 percent by weight DESA based on the weight of the LLDPE.
7. DBS (0.1%) = 0.1 percent by weight bis-benzylidene sorbitol based on the weight of the LLDPE. This is a nucleation agent.
8. Melt Index is determined under ASTM D-1238. It is reported in grams per 10 minutes.
9. Melt flow ratio is determined under ASTM D-1238.
10. Die Swell (%) is determined under ASTM D-1238. It is reported in percent.
11. Yellowness index is determined under ASTM D-1925. It is an indication of discoloration resistance; the higher the value, the lower the resistance. The first number represents the original color. The second number represents the color after 4 weeks of aging at 60° C.
12. Haze is determined under ASTM D-1003. It is reported in percent.

EXAMPLES 8 and 9

Masterbatches containing amorphorus silica and sodium zeolite having an average particle size of 3 to 4 microns and coated with 10 percent by weight DESA, the percent being based on the weight of the zeolite, are prepared. These masterbatches are letdown with the LLDPE described in Examples 1 to 8 in an amount of 5 percent by weight masterbatch based on the weight of the LLDPE. The compositions are extruded into blown film using a standard procedure.

Variables and results are set forth in Table II.

TABLE II

| | % by wt. | Coefficient of friction | Blocking force I | Blocking force II | Yellowness Index |
|---|---|---|---|---|---|
| Example 8 | | | | | |
| Amorphous silica | 0.50 | 0.20/0.17 | 9.1 | 11 | 6.5 |
| erucamide | 0.10 | | | | |
| zinc stearate | 0.05 | | | | |
| DESA | 0.05 | | | | |
| antioxidant (same as in examples 1 to 7) | 0.05 | | | | |
| TBPP | 0.06 | | | | |
| Example 9 | | | | | |
| Sodium zeolite as described above | 0.5 | 0.16/0.11 | 16 | 10 | 7.4 |
| erucamide | 0.1 | | | | |
| antioxidant (same as in examples 1 to 7) | 0.05 | | | | |
| TBPP | 0.05 | | | | |

Notes to Tables:
13. TBPP = tris (2,4-di-tert-butyl phenyl) phosphite ester.
14. % by wt. = percent by weight based on the weight of the main LLDPE. The balance of 5 percent by weight masterbatch is also LLDPE.
15. Coefficient of friction is determined under ASTM D-1894-75 using outside film surfaces relative to the tubular extrudate. The first number is the coefficient after 24 hours and the second number is the coefficient after one week.
16. Blocking force after one week as described in U.S. Pat. No. 3,647,738. Blocking force I represents the inside film surface and blocking force II represents the outside film surface.
17. The yellowness index number represents the color after 4 weeks of aging at 60° C.

EXAMPLES 10 to 14

The components are mixed and processed through a Brabender ™ extruder at 250° C. to provide a tape. All of the compositions contain 0.03 percent by weight of the antioxidant described in Examples 1 to 7 and 0.03 percent by weight of another antioxidant, TBPP.

Variables and results are set forth in Table III.

TABLE III

| | Example | | | | |
|---|---|---|---|---|---|
| | 10 | 11 | 12 | 13 | 14 |
| | (percent by weight) | | | | |
| LLDPE (as described in examples 1 to 7) | 99.92 | 99.89 | 99.87 | 99.87 | 99.87 |
| neutralizer I | 0.02 | — | 0.02 | 0.02 | 0.02 |
| zeolite I | — | 0.05 | 0.05 | — | — |
| zeolite II | — | — | — | 0.05 | — |
| zeolite III | — | — | — | — | 0.05 |
| melt index | 1.02 | 1.09 | 1.17 | 1.11 | 0.95 |
| melt flow ratio | 29.30 | 29.00 | 27.40 | 31.50 | 26.90 |
| die swell (%) | 29.70 | 40.60 | 29.70 | 33.40 | 27.30 |
| Yellowness Index | 8.38/ | 12.71/ | 11.98/ | 6.11/ | 7.90/ |

TABLE III-continued

| | Example | | | |
|---|---|---|---|---|
| 10 | 11 | 12 | 13 | 14 |
| | (percent by weight) | | | |
| 12.16 | 18.03 | 17.06 | 10.54 | 9.77 |

Notes to Tables:
18. Neutralizer 1 = zinc oxide.
19. Zeolite I = sodium zeolite (2 to 3 microns).
20. Zeolite II = Zeolite I coated with 15 percent by weight diethanol branched alkyl (C-12 to C-16) amine based on the weight of the zeolite. The amine has a polar group frequency factor of 0.32.
21. Zeolite III = Zeolite I coated with 15 percent by weight 3-hydroxypropyl modified polydimethylsiloxane based on the weight of the zeolite. The polydimethylsiloxane has a polar group frequency factor of 0.31.

We claim:
1. A multipurpose additive system comprising
(a) an alkali metal zeolite, an alkaline earth metal zeolite, zinc zeolite, or mixtures thereof;
(b) a dispersant, said dispersant being
   (i) a saturated aliphatic compound containing at least six carbon atoms substituted with one or more polar functional groups sufficient to provide a polar group frequency factor of at least about 0.01; or
   (ii) a polydimethylsiloxane compound containing from 4 to about 500 siloxane units, substituted with one or more polar functional groups sufficient to provide a polar group frequency factor of at least about 0.01, said polydimethylsiloxane compound having the following end groups:

$R_3SiO$ and/or $R'R_2SiO$ wherein R is methyl or ethyl and

R' is a linear, branched, or cyclic alkyl having 3 to 100 carbon atoms; or
   (iii) mixtures thereof in any proportions; and (c) optionally, zinc oxide.

2. The multipurpose additive system defined in claim 1 wherein the polar group frequency factor is in the range of about 0.01 to about 1.

3. The multipurpose additive system defined in claim 1 wherein the polar functional groups for component (b) (ii) are hydroxy, amino, hydroxylamino, hindered phenolic or hindered amino, epoxy, ethoxylate, carboxyl, or a carboxylate salt or ester.

4. The multipurpose additive system defined in claim 1 wherein component (a) is an alkali metal zeolite.

5. The multipurpose additive system defined in claim 1 wherein component (a) is an alkaline earth metal zeolite.

6. The multipurpose additive system defined in claim 1 wherein component (a) is a zinc zeolite.

7. The multipurpose additive system defined in claim 1 wherein the average particle size of component (a) is in the range of about 0.5 to about 15 microns.

8. The multipurpose additive system defined in claim 1 wherein the average particle size of component (a) is in the range of about 3 to about 8 microns.

9. The multipurpose additive system defined in claim 1 wherein component (a) is coated with a surface active agent.

10. The multipurpose additive system defined in claim 9 wherein the surface active agent is present in an amount of about 1 to about 20 percent by weight based on the weight of component (a).

11. The multipurpose additive system defined in claim 1 wherein the weight ratio of component (a) to dispersant is about 0.1:1 to about 4:1.

12. The multipurpose additive system defined in claim 1 wherein the dispersant is component (b)(ii).

13. A composition comprising a thermoplastic resin and the multipurpose additive system defined in claim 1.

14. A composition comprising a thermoplastic resin and the multipurpose additive system defined in claim 9.

15. A process for extrusion comprising mixing the multipurpose additive system defined in claim 1 with a thermoplastic resin and extruding the mixture.

16. A process for extrusion comprising mixing the multipurpose additive system defined in claim 1 with an ethylene based thermoplastic resin and extruding the mixture.

17. A composition comprising a crosslinked thermoplastic resin and the multipurpose additive system defined in claim 1.

* * * * *